US008175025B2

(12) United States Patent  
Yanagihara

(10) Patent No.: US 8,175,025 B2  
(45) Date of Patent: May 8, 2012

(54) WIRELESS COMMUNICATION APPARATUS FOR SELECTING SUITABLE TRANSFER ROUTE ON WIRELESS NETWORK

(75) Inventor: Kentarou Yanagihara, Hyogo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 657 days.

(21) Appl. No.: 12/344,390

(22) Filed: Dec. 26, 2008

(65) Prior Publication Data

US 2009/0168690 A1 Jul. 2, 2009

(30) Foreign Application Priority Data

Dec. 27, 2007 (JP) ................................. 2007-336984

(51) Int. Cl.
*H04B 7/14* (2006.01)
(52) U.S. Cl. ........................................................ 370/315
(58) Field of Classification Search .................. 370/315, 370/338; 455/445
See application file for complete search history.

(56) References Cited

U.S. PATENT DOCUMENTS

| 2004/0162059 A1* | 8/2004 | Hiltunen et al. ........... 455/412.1 |
| 2005/0108427 A1* | 5/2005 | Datta ............................ 709/238 |
| 2008/0159439 A1* | 7/2008 | Bitran .......................... 375/316 |

FOREIGN PATENT DOCUMENTS

| JP | 2006-157637 | 6/2006 |
| JP | 2006-203508 A | 8/2006 |

OTHER PUBLICATIONS

Satoru Takagishi et al.,"Expansion of IEEE 802.15.4/ZigBee MAC Beacon Mode in Layered-Tree Networks with Time Shift Grouping Access",IEICE Technical Report, The Institute of Electronics, Information and Communication Engineers, Japan, Jun. 21, 2007, vol. 107, No. 113, pp. 19 to 24.
Jaeshung, Shin et al., "On-demand diversity wireless relay networks", Mobile Networks and Applications, Luwer Academic Publishers, BO, vol. 11, No. 4, May 4, 2006, pp. 593-611.
Dongkyun, Kim et al, "RODA: a new dynamic routing protocol using dual paths to support asymmetric links in mobile ad hoc networks", Computer Communications and Networks, 2000, Proceedings, Ninth International Conference in Las Vegas, NV, IEEE, Oct. 16, 2000, Piscataway, NJ, IEEE, Oct. 16, 2000, pp. 4-8.

(Continued)

*Primary Examiner* — Gary Mui
*Assistant Examiner* — Richard K Chang
(74) *Attorney, Agent, or Firm* — Rabin & Berdo, P.C.

(57) ABSTRACT

A wireless communication apparatus prepared in each of wireless terminals configuring a wireless network adapted to transmit and receive a data signal and terminal information to and from peripheral wireless terminals of a subject wireless terminal; to manage the terminal information received from the peripheral wireless terminals; to determine a relay network to which the subject terminal belongs on the basis of the terminal information of the peripheral wireless terminals when the subject terminal can be connected to at least one of the relay networks provided within the wireless network; to transmit terminal information including information indicating the relay network of the subject terminal to the peripheral wireless terminal; and to use the relay network of the subject terminal as a data signal transfer route to perform forward processing. Thus, the apparatus can prepare plural transfer routes to avoid wireless signal interference and collision and balance the power consumption among the terminals.

20 Claims, 6 Drawing Sheets

OTHER PUBLICATIONS

Higaki, H., "LBSR: Routing Protocol for MANETs with Unidirectional Links", Third IEEE International Conference on Wireless and Mobile Computing, Networking and Communications (WIMOB 2007), IEEE, Piscataway, NJ, Oct. 8, 2007.

Higa, Y. et al., "One-way Relay for Wireless Multihop Networks associated with the Intermittent Periodic Transmit and the Spiral Mesh Routing", Vehicular Technology Conference, 2005, IEEE 61st, Piscataway, NJ, vol. 5, May 30, 2005, pp. 2102-3206.

Ramasubramanian, V. et al., "Providing a bidirectional abstraction for unidirectional ad hoc networks", Proccedings IEEE INFOCOM 2002, The Conference on Computer Communications, 21st Annual Joint Conference of the IEEE Computer and Communications Societies, New York, NY, Jun. 23-27, 2002, Proccedings IEEE Infocom, vol. 3, Jun. 23, 2002, pp. 1258-1267.

Tam, Wai-Hong et al., "Joint Multi-Channel Link Layer and Multi-Path Routing Design for Wireless Mesh Networks", INFOCOM 2007, 26th IEEE International Conference on Computer Communications, May 1, 2007, pp. 2081-2089.

* cited by examiner

FIG. 1A
FIG. 1B
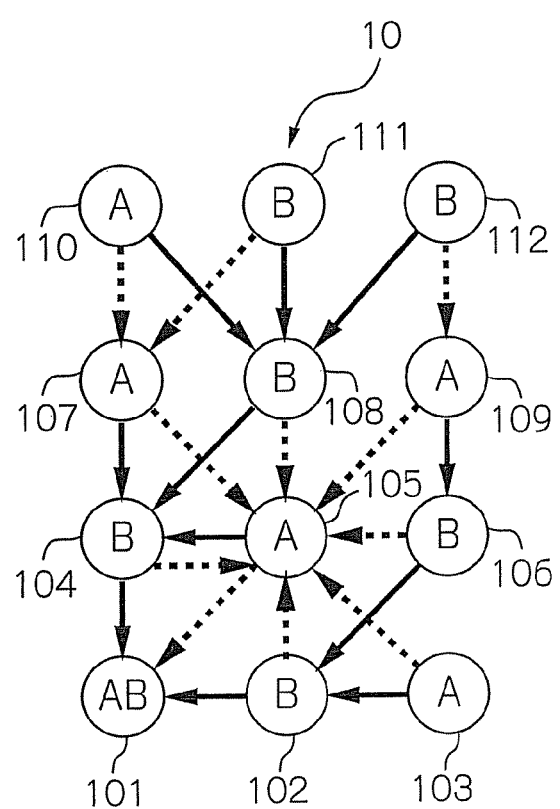
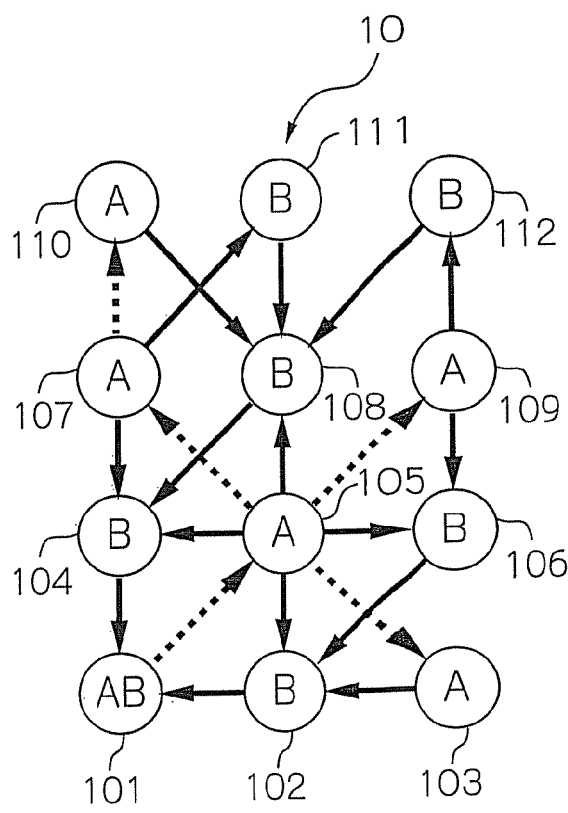

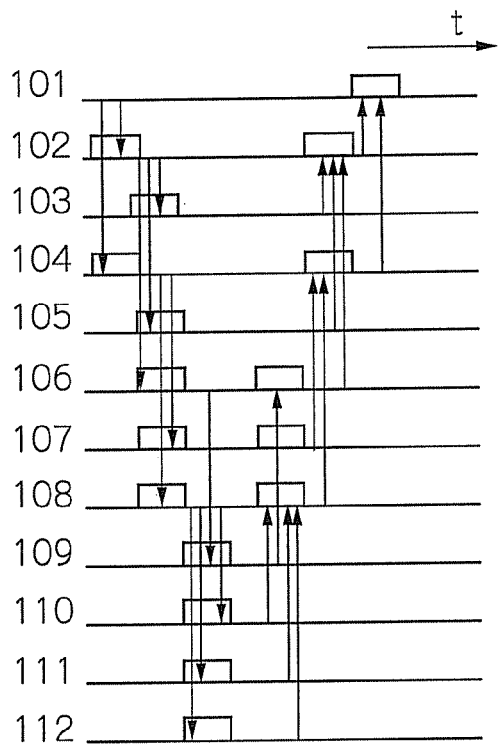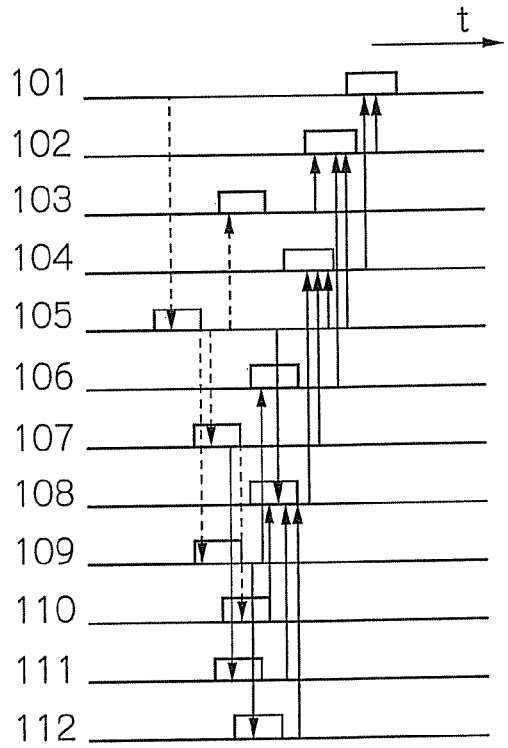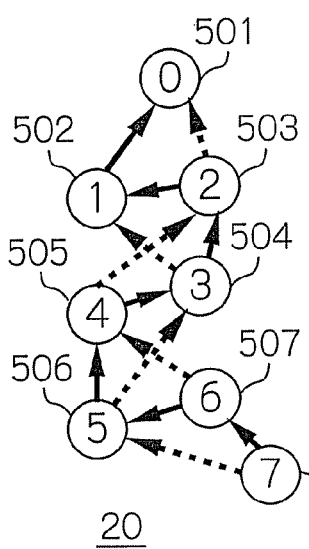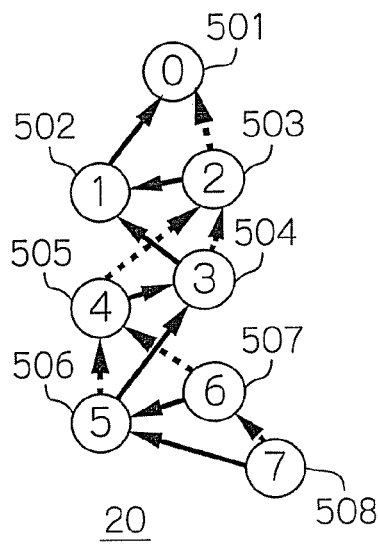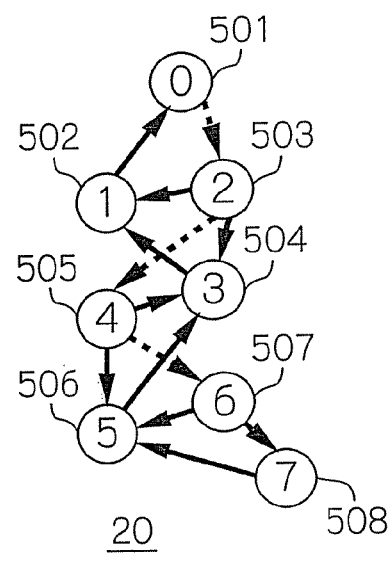

WIRELESS COMMUNICATION APPARATUS FOR SELECTING SUITABLE TRANSFER ROUTE ON WIRELESS NETWORK

BACKGROUND OF THE INVENTION

1. Field of the Invention

The present invention relates to a wireless communication apparatus for selecting a suitable transfer route on a wireless network, and more specifically to such an apparatus, for setting a transfer route, for example, in a multi-hop wireless network such as a sensor network. The present invention also relates to a method and a computer program for implementing such an apparatus, as well as a wireless network for utilizing such an apparatuses.

2. Description of the Background Art

Conventionally, in a telecommunications network consisting of a plurality of communication terminals, various types of communication systems have been developed to communicate with other terminals not directly connected to the communication terminals by repeating transmission and receipt of packets between adjacent ones of those terminals.

In addition, in the network, a relaying terminal must select appropriate one of adjacent terminals which corresponds to the destination of a packet received for transmitting the packet to the terminal thus selected. This process is called route control, for which various schemes have been developed.

Generally, the route control selects a route with the minimum number of relaying hops. Thus, the selected route between two terminals may be often the same between upward and downward links.

In a wired network, because upward and downward communications are operated completely separately from each other, i.e. in a full duplex system, if the upward and downward communications use the same route, no problems would be caused.

By contrast, in wireless communications, upward and downward communications may not be frequently operated simultaneously, i.e. in a half-duplex system, and then the upward and downward communications may simultaneously take place to thus lower the efficiency of the communications.

Japanese patent laid-open publication No. 2006-157637 discloses a proposed system coping with the problems caused by the simultaneous occurrence of the upward and downward communications. In the proposed system, an inward gateway wireless station and an outward gateway wireless station are separately installed from each other so as to use all wireless communication paths as one-way routes.

However, when the route control scheme is adopted in a wireless multi-hop network, some problems may be caused as following.

Firstly, almost all wireless communication systems use the half-duplex communication so that the upward and downward communications cannot be performed simultaneously. If the paths of the upward and downward communications took the same route, wireless signals could interfere and collide with each other.

Secondly, in almost all communication systems, levels required for the delay and quantity of communications are asymmetric between the upward and downward communications. Therefore, if the upward and downward communications took the same route, the both communications would naturally be provided with the same quality. Thence, in an application in which the qualities required for the upward and downward communications may differ from each other, if a route is selected which has its quality suited to higher one, then the route may be provided in surplus.

Thirdly, the existing route control systems rely upon wired networks so as to be designed to select appropriate one of a limited variety of terminals physically connected. By contrast, in the wireless multi-hop network, especially sensor network, there are many terminals capable to communicate directly with devices existing in the periphery thereof, and moreover, the nature of wireless transmission provides communication connections apt to abruptly vary with respect to time. Thus, the existing route control scheme may thus fail to select an appropriate terminal.

Fourthly, the conventional route control scheme tends to cause communications to converge on a specific terminal, so that a lot of wireless signals may collide in the vicinity of such a specific terminal to thus lower the communication efficiency. Since the terminal on which the communications converges transfers a lot of packets, it consumes more electric power consumption than other terminals. Wireless multi-hop networks are designed on the assumption that the terminals operate with battery, and therefore the power consumption must be balanced between those terminals in order to extend the operating time of the entire network.

Although the system disclosed by the above-mentioned Japanese patent publication '637 can resolve the first problem, it needs to install at least two gateway wireless stations at separate positions, thereby causing a problem of increasing the cost.

SUMMARY OF THE INVENTION

It is an object of the present invention to provide an improved wireless communication apparatus for use in a wireless communication network. It is a more specific object of the present invention to provide a wireless communication apparatus that is capable of avoiding interference/collision between wireless signals, balancing a power consumption between communication terminals or reducing the total power consumption of a communication network, and avoiding a communication interruption due to the failure of such a terminal or disconnection of a wireless link between the terminals. It is another object of the invention to provide a method, a computer program and a wireless communication network for such a wireless communication.

In accordance with the present invention, in a wireless communication network a plurality of transfer routes is established on the wireless network. More specifically, there is provided a wireless communication apparatus included in a wireless terminal forming a wireless communication network. The apparatus comprises: a communication section for transmitting and receiving a data signal and terminal information to and from a peripheral wireless terminal existing in periphery of the wireless terminal including said apparatus; a terminal information manager for managing the terminal information received from the peripheral wireless terminal; a relay network determiner for referencing the terminal information of the peripheral wireless terminal, and determining, when the wireless terminal including said apparatus can be connected to at least one of a plurality of relay networks provided within the wireless network, a relay network to which the wireless terminal including said apparatus belongs; a terminal information advertiser for transmitting terminal information including information indicating the relay network of the wireless terminal including said apparatus to the peripheral wireless terminal; and a forward processor for using the relay network of the wireless terminal including said apparatus as a data signal transfer route to perform forward processing.

Further, in accordance with the invention, there is provided a method of communicating by a wireless communication apparatus included in a wireless terminal forming a wireless communication network. In the method, the apparatus comprises a communication section, a relay network determiner, a terminal information advertiser, a forward processor and a terminal information manager for managing terminal information received from a peripheral wireless terminal. The method comprises: a communicating step of transmitting and receiving by the communication section a data signal and the terminal information to and from the peripheral wireless terminal existing in periphery of the wireless terminal including the apparatus; a relay network determining step of referencing by the relay network determiner the terminal information of the peripheral wireless terminal, and determining, when the wireless terminal including the apparatus can be connected to at least one of a plurality of relay networks provided within the wireless network, a relay network to which the wireless terminal including the apparatus belongs; a terminal information advertising step of transmitting by the terminal information advertiser terminal information including information indicating the relay network of the wireless terminal including the apparatus to the peripheral wireless terminal; and a forward processing step of using by the forward processor the relay network of the wireless terminal including the apparatus as a data signal transfer route to perform forward processing.

Moreover, in accordance with the present invention, there is provided a wireless communication program for use in a wireless communication apparatus included in a wireless terminal forming a wireless communication network. The program controls a computer to operate: a communication section to transmit and receive a data signal and terminal information to and from a peripheral wireless terminal existing in periphery of the wireless terminal including the apparatus; a terminal information manager to manage the terminal information received from the peripheral wireless terminal; a relay network determiner to reference the terminal information of the peripheral wireless terminal, and to determine, when the wireless terminal including the apparatus can be connected to at least one of a plurality of relay networks provided within the wireless network, a relay network to which the wireless terminal including the apparatus belongs; a terminal information advertiser to transmit terminal information including information indicating the relay network of the wireless terminal including the apparatus to the peripheral wireless terminal; and a forward processor to use the relay network of the wireless terminal including the apparatus as a data signal transfer route to perform forward processing.

Furthermore, in accordance with the present invention, there is provided a wireless communication network including a plurality of wireless terminals. In the wireless network, said wireless terminal includes the wireless communication apparatus mentioned above. The wireless network transmits and receives terminal information to configure the relay networks in plural, whereby said wireless terminal in the wireless network is capable of being connected to at least one or all of said relay networks.

According to the wireless communication apparatus of the present invention, a plurality of transfer routes are prepared in the wireless network, and therefore, the apparatus can avoid interference and collision between wireless signals, balance the power consumption among the terminals or reduce the total power consumption, and avoid a communication interruption otherwise caused by terminal failure or wireless link disconnection.

BRIEF DESCRIPTION OF THE DRAWINGS

The objects and features of the present invention will become more apparent from consideration of the following detailed description taken in conjunction with the accompanying drawings in which:

FIGS. 1A and 1B schematically show communication between wireless terminals on a wireless network in accordance with an illustrative embodiment of the present invention;

FIGS. 6A and 6B schematically show another example of communication directions and terminal activation time on the wireless network shown in FIG. 1;

FIGS. 7A, 7B and 7C schematically show communication between wireless terminals on a wireless network in accordance with an alternative embodiment of the present invention;

DESCRIPTION OF THE PREFERRED EMBODIMENTS

Figure 2:
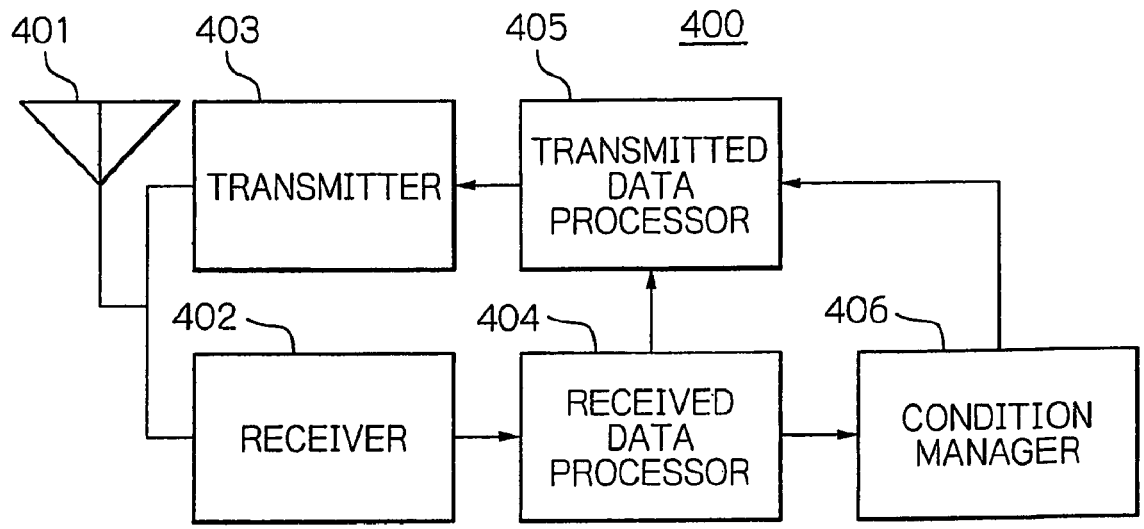
FIG. 2 is a schematic block diagram of the wireless terminal of the illustrative embodiment shown in FIG. 1.

An illustrative embodiment of a wireless communication network system according to the present invention will be described in detail with reference to the accompanying drawings. In the illustrative embodiment, a wireless multi-hop network comprises a plurality of wireless communication apparatuses, i.e. wireless terminals which respectively introduce the prevent invention.

FIGS. 1A and 1B schematically show communication between the wireless terminals on the wireless multi-hop network in accordance with the illustrative embodiment. With reference to the figures, the illustrative embodiment includes a wireless multi-hop network 10 comprising a plurality of wireless terminals 101 to 112. Specifically, the wireless terminal 101 is equipped with the management function of managing the entire network, herein after being referred often to as a coordinator.

In FIGS. 1A and 1B, a solid line and a dotted line connecting two wireless terminals indicate a wireless link established between both wireless terminals, and the arrow of each line indicates the direction of transmitting information, i.e. communication direction. It should be noted that although on the network 10 a great number of connections for direct communication are possible in practice between the wireless terminals other than what are depicted, the figures show only the connections of the solid and dotted lines merely for simplicity of illustration and description.

FIG. 1A shows an example of network condition when the network 10 is configured. FIG. 1B shows another example of network condition while the network 10 is used. However, FIG. 1A partially shows when the network 10 is used.

In FIGS. 1A and 1B, the capital letters "A" and "B" enclosed with the circles in connection with the wireless terminals 101 to 112 indicate a network type, to which each of the wireless terminals 101 to 112 belongs.

The coordinator 101 exceptionally belongs to both networks A and B in order to perform the network management. The illustrative embodiment is structured with the two distinctive networks A and B. However, three or more distinctive networks are applicable.

The network shown in FIG. 1A is structured so as to satisfy the requirements as following.

As a first requirement, the networks A and B use different wireless links from each other. In FIG. 1A, the wireless links of the network A are indicated with the dotted lines, while the other wireless links of the network B with the solid lines.

As a second requirement, each wireless terminal transfers only packets conveyed over the network to which that terminal belongs.

As a third requirement, every wireless terminal is connectable with both of the networks.

In the following, description will specifically be made on a communication between the coordinator 101 and the wireless terminals 102 to 112. Such description also may be applied to communication between any terminals.

For example, the wireless terminal 107 belonging to the network A can transfer only packets conveyed over the dotted line link. Actually, the terminal 107 can transfer only packets sent from the wireless terminals 110 and 111. However, if the wireless terminal 107 uses the network B, the terminal 107 transfers packets over the solid line link to the wireless terminal 104.

FIG. 1B shows the other example of configuring the networks which is an improvement on the example shown in FIG. 1A so that upward and downward communications are separated from each other. In the following description, communication from each wireless terminal to the coordinator 101 will be referred to as upward communication and communication opposite thereto as downward communication. In FIG. 1B, the network A is used for the downward communication, while the network B for the upward communication.

Between FIGS. 1A and 1B, the directions of the dotted line links are reversed with each other. Also between both figures, the links extending from the wireless terminals belonging to the network B to those belonging to the network A shown in one figure have, in the other figure, the direction thereof reversed and the lines representative of those links changed from the dotted line to the solid line or vice versa.

Such links may be used both for the data transfer of upward communication originated from a wireless terminal on the network A meant for the coordinator 101 and for the data transfer of downward communication from the coordinator 101 meant for a wireless terminal on the network B. Only for the purpose of description, such links will be described as links on the network B.

For instance, upward communication data generated from the wireless terminal 109 meant for the coordinator 101 is once transferred to the wireless terminal 112, and then transferred to the wireless terminals 112, 108 and 104 and the coordinator 101 in order.

In addition, for example, downward communication data from the coordinator 101 meant for the wireless terminal 112 is transferred to the coordinator 101, and the wireless terminals 105, 109 and 112 in order. Thus, the link between the wireless terminals 109 and 112 may be used for both upward and downward communication.

FIG. 2 is a schematic diagram showing one of the respective wireless terminals 101 to 112, which may be the same in structure. In FIG. 2, such one of the terminals is designated with a reference numeral 400, and will be described as following.

In FIG. 2, the wireless terminal 400 according to the illustrative embodiment includes at least an antenna 401, a receiver 402, a transmitter 403, a received data processor 404, a transmitting data processor 405, such as a transmitting data generator, and a condition manager 406, which are interconnected as illustrated.

The antenna 401 is adapted for receiving a wireless signal to feed the received wireless signal as a reception signal to the receiver 402 and also transmitting a transmission signal fed from the transmitter 403 in the form of wireless signal. In the illustrative embodiment, the antenna 401 may be equipped with a transmitter and receiver antenna function capable of both reception and transmission of wireless signals. Alternatively, it may comprise reception and transmission antennas physically separated.

The receiver 402 is adapted to demodulate and convert a reception signal from the antenna 401 to a corresponding digital signal, and feed the converted digital data as reception data to the received data processor 404.

The received data processor 404 receives the reception data from the receiver 402 to provide the reception data, when addressed to that terminal 400, i.e. own terminal, with necessary signal processing, and then feed required data of the processing results to the condition manager 406. The received data processor 404, when having received a data signal addressed to a terminal other than that own terminal 400, determines a forwarding destination of that data signal on the basis of the information provided by the condition manager 406, and then addresses the data signal to the forwarding destination thus determined to feed the data signal to the transmitting data generator 405.

The transmitter 403 receives transmission data which is generated by and outputted from the transmitting data generator 405, and then modulates the transmission data to feed it to the antenna 401.

The transmitting data generator 405 may generate transmission data addressed to a forwarding destination by using peripheral terminal information on terminals existing in the periphery of the own terminal 400, the peripheral terminal information being obtained from the condition manager 406. The transmitting data generator 405 feeds the generated transmitting data to the transmitter 403. The transmitting data generator 405 may forward the data signal addressed to other terminals by using such peripheral terminal information available from the condition manager 406.

The condition manager 406 receives reception data from the received data processor 404, and manages, on the basis of the receive data, the peripheral terminal information, the network to which the own terminal 400 belongs, and the setting and maintaining of transfer routes to the respective networks. The operation of the condition manager 406 will be described in detail later on. Now, the characteristic functions of the condition manager 406 according to the illustrative embodiment will be described with reference to FIG. 3.

Figure 3:
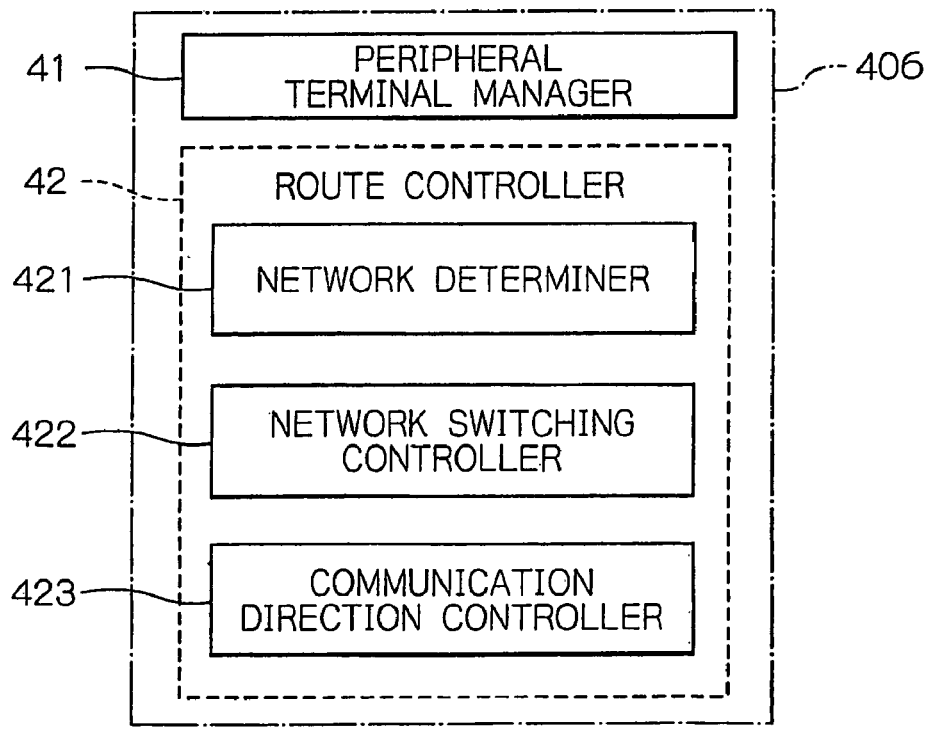
FIG. 3 is a schematic block diagram of the condition manager of the wireless terminal shown in FIG. 2.

As seen from FIG. 3, the condition manager 406 includes at least a peripheral terminal manager 41 and a route controller 42. The route controller 42 includes at least a network determiner 421, a network switching control 422, and a communication direction control 423.

The peripheral terminal manager 41 is adapted to manage information on the peripheral wireless terminals on the basis of notice signals collected from the peripheral terminals. A notice signal contains at least information indicating the network to which that peripheral terminal belongs. The communication signal may also include terminal identification information for identifying peripheral terminals, timing information of data transmission or reception of peripheral terminals or information indicating the connecting status of the own terminal 400.

The route controller 42 is adapted to control the configuration of a plurality of relay networks, e.g. networks A and B, in the wireless multi-hop network 10, the determination of the network to which the own terminal 400 belongs, the data forwarding, and the processing on using a relay network.

The network determiner 421 is adapted to determine, after a period of time which has its duration random or predetermined elapses and during which the terminal 400 can be connected to both networks A and B at the time of configuring a network, which of the networks A and B the own terminal 400 belongs to, viz. parent network, on the basis of the peripheral terminal information, and then transmit to the peripheral terminals a notice signal conveying the information on the determined network.

When the network determiner 421 fails to determine a network to which the own terminal 400 belongs in a predetermined period of time after having received a notice signal from the peripheral terminals, it may transmit a change request signal to required terminals to request a reconfiguration of the parent network.

The network switching control 422 is adapted to appropriately select a network for a destination when using the networks to switch the network regularly. The network switching control 422 also controls, after having selected the network for use, turning on and off the power of the receiver according to a duration for receiving data under the network condition. Thus, the receiver can be powered on only for a duration required for data reception. The controlling of the network switching by the switching control 422 will be described in detail later on.

The communication direction control 423 is adapted to appropriately select a network for a destination and a wireless channel corresponding to a change in a transfer route and a wireless channel for use, depending on a communication direction. The communication direction control 423 also controls turning on and off the power of the receiver according to a duration for receiving data in the wireless terminal for the data destination. The controlling of the direction control 423 will be described in detail later on.

Now, the transfer route setting operation in the wireless multi-hop network 10 according to the illustrative embodiment will be described. Description will be made on a case where two networks are constructed simultaneously in the wireless multi-hop network 10 to determine transfer routes on the networks. The number of the networks is not specifically limited to the specific example. To constructing networks, various manners are applicable so far as such manners satisfy the above-mentioned requirements for network construction.

With reference to FIG. 1, merely for the purpose of illustration, signals transmitted from the respective wireless terminals 101 to 112 can reach up to terminals that are arranged next to or diagonally opposite the subject terminal, i.e. terminal of interest. In other words, for example, if signals are transmitted from the wireless terminal 105, the wireless terminals 101 to 104 and wireless terminals 106 to 109 can receive the signals from the wireless terminal 105. However, the wireless terminals 110 to 112 cannot receive the signals.

First, description will be made on the case where the networks to which the wireless terminals 101 to 112 belong will respectively be determined so that the networks as shown in FIG. 1A are constructed in the flow.

The coordinator 101 belongs to both of the networks A and B. From the coordinator 101, a notice signal is transmitted.

The notice signal from the coordinator 101 is received by the wireless terminals 102, 104 and 105. Each of the terminals 102, 104 and 105 determines, on the basis of the notice signal, which of the networks A and B that terminal belongs to, and then transmits another notice signal, indicating the parent network, to its peripheral terminals.

Then, the wireless terminal which received the notice signal from wireless terminal 102, 104 or 105 determines its parent network, i.e. A or B, to which the own terminal belongs, according to the condition of the parent networks of its peripheral terminal, and then transmits still another notice signal, indicating the parent network, to its peripheral terminals.

As described above, the notice signals are transmitted and received between the wireless terminals 102 to 112 so that each of the terminals 102 to 112 belongs to either of the networks A and B while having the wireless links for both networks.

Figure 4:
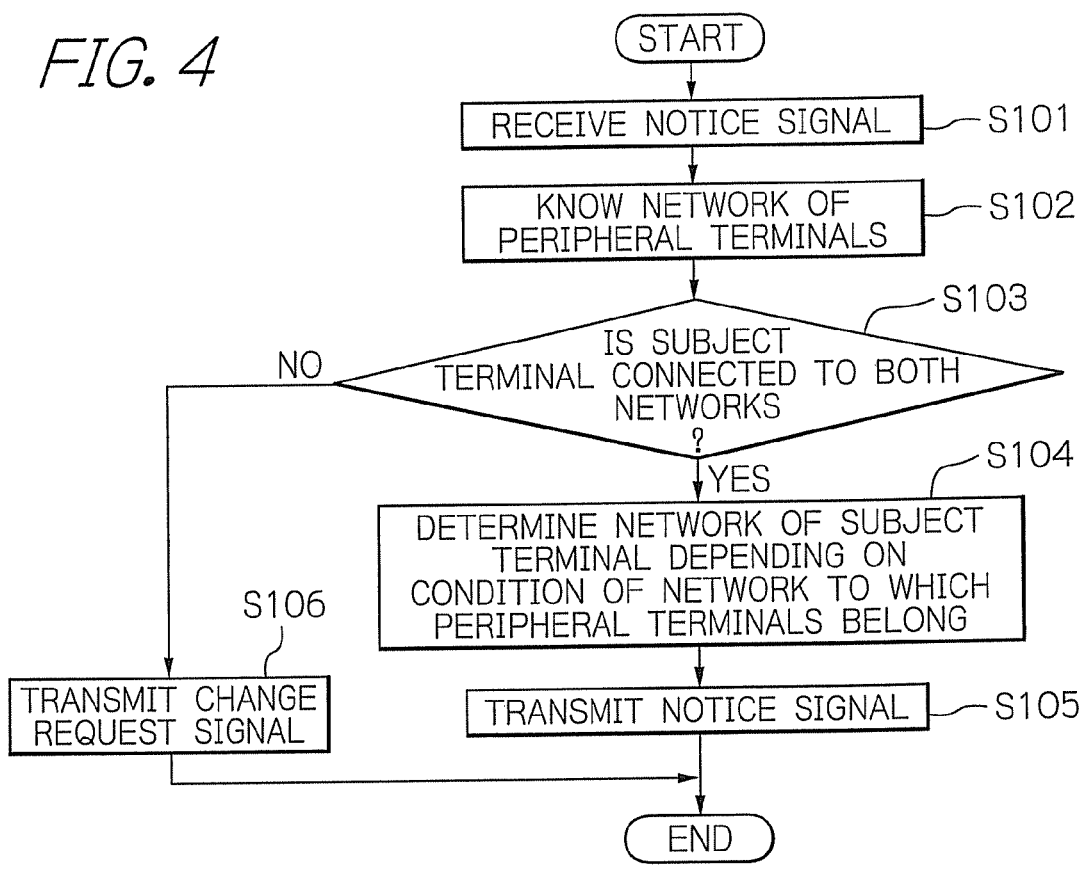
FIG. 4 is a flowchart useful for understanding how the communication on the wireless network shown in FIG. 1 establishes.

FIG. 4 is a flowchart useful for understanding how the parent networks are determined on the wireless networks 102 to 112. In the following, description will be focused on the operation of determining the parent networks of the wireless terminals 102 to 112.

First, if the notice signal transmitted from the peripheral terminal is given in step S101 to a wireless terminal of interest, then that terminal of interest, i.e. a subject wireless terminal, can know the parent network of the peripheral terminal on the basis of the received notice signal in step S102. Information about the parent network of the peripheral terminals is managed by the peripheral terminal manager 41.

The wireless terminal of interest may receive the notice signals from the peripheral terminals to know the parent networks of the latter. Then, the terminal of interest, i.e. subject terminal, is connected to those peripheral terminals over the wireless links. The terminal of interest is thus allowed to communicate directly with both networks A and B in step S103. After waiting for a period of time having its duration random, the parent network is determined on the basis of the network condition indicating to which network the peripheral terminals belong, in step S104, and the notice signal indicating the determined parent network is transmitted in step S105.

Here, the parent network may be determined such a manner that, for example, information on the network condition of the peripheral terminals is used to select as a parent network may one of the networks which has terminals fewer in number belonging to itself.

For instance, in FIG. 1A, if the notice signal from the coordinator 101 is given to the wireless terminals 102, 104 and 105, the wireless terminals 102, 104 and 105 determine respective parent networks.

In this case, for example, the wireless terminal 102 determines that it belongs to the network B, and then transmits the notice signal indicating the determination. In turn, the wireless terminal 105 determines that it belongs to the network A and transmits the notice signal similarly.

In addition, the wireless terminal 103 can be connected to the wireless terminals 102 and 105, thereby connectable to both networks A and B. Thus, the wireless terminal 103 determines itself belonging to the network A, and then transmits the notice signal accordingly. Similarly, all the wireless terminals 102 to 112 determine their parent networks.

In the above-mentioned example, the wireless terminal 102 determines itself belonging to the network B, but may determine which ever network as its parent network. In addition, the wireless link may be constructed, e.g. in a manner that the number of hops up to the coordinator 101 is minimum.

In step S103, when the wireless terminal fails to be connected to both networks, it transmits the change request signal to a given, or specific, terminal in step S106.

For instance, when one of the wireless terminals 102 to 112 fails to be connected to any networks upon a given period elapsing since it received multiple notice signals from the peripheral terminals, that terminal transmits the change request signal to the given terminal for requesting to change the parent network.

The given terminal, i.e. terminal capable of changing the parent network, is limited to those which have no such terminals connected to that terminal as a destination. If a terminal having itself connected as a destination were specified as a given terminal, then the network constructing conditions of the wireless terminal thus connected would be violated so as to cause the construction of the networks beyond that terminal to be disturbed.

For example, assume that the wireless terminal 103 has no such terminal that is connected to itself as a destination, and the wireless terminal 109 has the wireless terminal 112 connected to itself as a destination. Under the circumstances, the one wireless terminal 103 can change the parent network from the network A to the network B, although the other wireless terminal 109 cannot change its parent network since no terminal would, otherwise, belong to the network A to which the wireless terminal 112 is connectable to render the network constructing requirements to be violated.

The destination of the change request signal can be determined, for example, by selecting a wireless terminal not included in destinations in the notice signal, i.e. by selecting a wireless terminal that has no terminals connected to that terminal, so that the selected wireless terminal is made the given terminal.

The given wireless terminal that received the change request signal checks terminals connected with the own terminal as a destination. If such a connected terminal is not detected, the given wireless terminal changes its parent network according to the request. Then, the given wireless terminal transmits to the source terminal, i.e. the terminal having sent the request, a change notice indicating that the parent network was changed. The source wireless terminal having received this change notice performs again the parent network determination for determining its parent network.

As described above, after transmitting the notice signal between the wireless terminals 101 to 112 to produce a network construction as shown in FIG. 1A, for example, the communicating direction of the network A is controlled to the reversed direction in response to the notice signal from the coordinator 101. Thus, a network construction is produced as shown in FIG. 1B.

Next, the operation of switching the parent networks by the wireless terminals 102 to 112 will be described. A manner of switching the parent networks may be utilized in the condition shown in FIG. 1A.

The illustrative manner of switching the parent networks may be applied to switching the network to be used into either the network A or B, and be performed by the network switching control 422 in the condition manager 406.

Since all the wireless terminals 102 to 112 belong to either the network A or B, if either of the networks A and B is operative, then the communications can be established between all the wireless terminals.

Every wireless terminal, 102 to 112, also can relay communication in either of the networks A and B. In other words, the wireless terminals 102 to 112 perform relaying when the parent network of the own terminal is switched.

In addition, the wireless terminals 102 to 112, when not relaying, need not always keep its receiver section turned on, but may turn it on only when they transmit data or inquire regularly whether or not there is data addressed to themselves. Thus, this significantly contributes to the reduction in power consumption.

Thus, by switching the network to be use as required, e.g. regularly or in response to an instruction from the coordinator 101, the power consumption can be balanced among the wireless terminals while lifetimes of the terminals can be increased, e.g. doubled, compared with a case where the network cannot be switched.

To the timing of switching the networks, various manners can be applied. For example, in one manner, all the wireless terminals switch synchronously or simultaneously the respective networks, or in another manner, the coordinator broadcasts switching signals to all the terminals, i.e. in a flooding, for switching the networks.

Even when both networks temporarily operate simultaneously, data communication would not seriously be affected. Therefore, strict simultaneity does not need for switching the networks by all the wireless terminals.

Moreover, the selecting operation of a communication manner corresponding to the communication direction, such as the upward or downward direction, for use will be described. Such a selecting manner may be utilized in the condition shown in FIG. 1B.

According to a manner of selecting the communication direction, for example, the network B can be used for the upward communication while the network A can be used for the downward communication so that all packets are transferred in the direction shown by the arrows in FIG. 1B. This selecting manner is performed by the communication direction control 423 in the condition manager 406.

Since all the wireless terminals 102 to 112 are connected to both networks A and B, even when the network is used on a one-way traffic, a communication path between any wireless terminals can be maintained as established.

Here, the communication direction control 423 can suitably select a communication channel corresponding to the upward or downward direction. For instance, to the communication direction control 423, applicable is a manner of determining the available channel with regard to the wireless terminals 102 to 112 depending on the network to which the terminal belongs. As one example, the wireless terminal belonging to the network A may use a channel A, while the other wireless terminal belongs to the network B may use a channel B. In this case, the coordinator 101 exceptionally uses the channel B for receiving the upward communication.

Alternatively, for instance, the communication direction control 423 may select the channel according to a channel used by a terminal for data signal destination. Specifically, for example, when the wireless terminal 107 selects a channel, the channel A is used for transmission from the wireless terminal 107 to the wireless terminal 110, while the channel B is used for transmission from the wireless terminal 107 to the wireless terminal 111.

When the network is configured, it is necessary to determine either one of channels to be used. To accomplish this, a unified channel used by all the wireless terminals may be determined, or a channel available for configuring the network may be fixed in advance.

The operation of utilizing efficient sleep control will now be described. The sleep control may be utilized in the condition shown in FIG. 1B.

The selection manner of the communication direction mentioned above may cause the communication efficiency to be improved. However, the power consumption of the wireless terminals 101 to 112 will not be reduced. According to the sleep control manner, the respective wireless terminals 102 to 112 can regularly turn on and off the power sources of their receiver sections, thereby saving electric power. The sleep control may be performed by the communication direction control 423.

The sleep control manner may generally be classified into two types, which will be exemplified below.

In a first example, all the wireless terminals are simultaneously activated for a determined duration. The first example has an advantage in which it prevents delay of the data communication from increasing, although the effect of power saving according to the first example is limited.

Figure 5A:
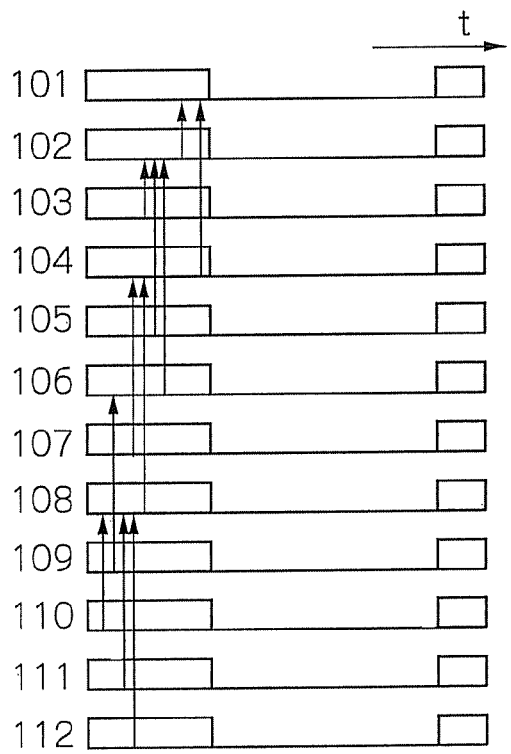
FIGS. 5A and 5B schematically show an example of communication directions and terminal activation time on the wireless network shown in FIG. 1.

FIG. 5A schematically shows an illustrative operation of the first example, which utilizes the network B shown in FIG. 1B. In FIG. 5A, rectangles are shown with regard to the respective wireless terminals 101 to 112, each rectangle indicates in the horizontal direction a duration in which the receiver section in the corresponding wireless terminal is active, i.e. a duration for turning on the power source of the receiver section. In addition, the upward-directed arrow in FIG. 5A indicate the transfer route of the upward communication.

In FIG. 5A, all the wireless terminals 101 to 112 have the respective receiver sections simultaneously powered on, and accordingly the upward and downward communications are delayed with the same amount of time. The first example however needs to be maintained synchronous over the entire network, and may cause a further problem such as larger overhead.

In a second example, without synchronizing the entire network, the timing of turning on and off the receiver section of the each wireless terminal is adjusted so that delay of this timing from similar timings on the peripheral terminals is minimized. According to the second example, the electric power can effectively be saved. However, the timing of turning on and off the receiver section is necessarily be adjusted to similar timings on the peripheral terminals on either upward or downward route. Therefore, the communication in the direction, not adjusted, may significantly be delayed.

The wireless terminal transmits and receives to and from the peripheral terminals a communication signal including the information on a data reception timing on the own terminal, thereby being able to know the data reception timing of each peripheral terminal.

Figure 5B:
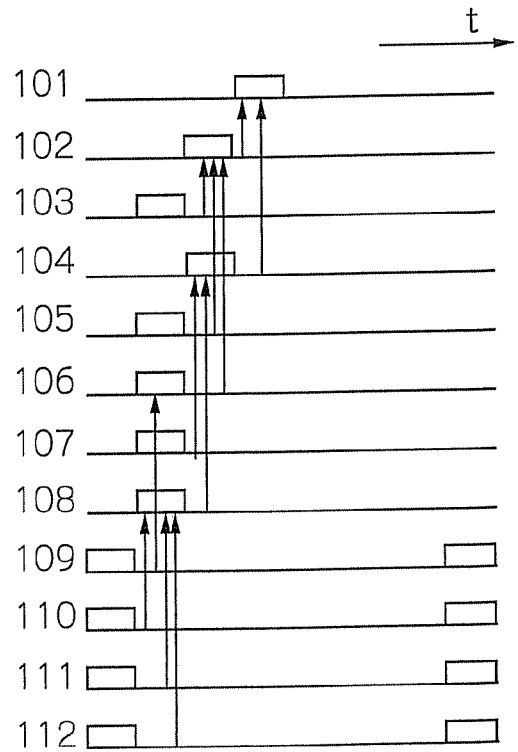

FIG. 5B schematically shows an illustrative operation in the second example. The upward communication according to the second example shown in FIG. 5B may accomplish a more significant reduction in activation or boot time period of the wireless terminals 101 to 112 compared with the upward communication according to the first example shown in FIG. 5A.

However, unless the different networks are utilized, i.e. there is the sole subject network, then a delay in downward communication on the subject network could be significantly increased. For instance, when data is transmitted from the wireless terminal 101 to the wireless terminal 105, a delay corresponding to almost one interval will be brought since a packet was transferred from the wireless terminal 101 to the wireless terminal 102 till it is transferred from the wireless terminal 102 to the wireless terminal 105.

For solving such an increase in downward communication delay, the communication direction control 423 can determine reception timings for the upward communication separately from the downward communication. In other words, the communication direction control 423 controls turning on and off the power source of the receiver section according to the reception timings for the upward and downward communications.

With reference to FIG. 6A, an illustrative operation of the wireless multi-hop network 10 in the illustrative embodiment will be described in the case where the reception timings for the upward and downward communications are set. The left half of FIG. 6A shows the reception timings or receive slots of the downward communication and the right half shows those for the upward communication.

Thus, the example shown in FIG. 6A can separate the upward and downward communications from each other and reduce a delay caused on duplex communication although the activation time of the receiver section in the wireless terminals 101 to 112 is increased compared with the second example shown in FIG. 5B.

FIG. 6B schematically shows an illustrative operation using the sleep control manner in the wireless terminals on the deferent networks.

In FIG. 6B, the dotted arrows indicate communications using the network A, mainly the downward communication, while the solid arrows indicate communications using the network B, mainly the upward communication. With such a configuration, it is possible to keep the time of turning on the receiver sections for all the wireless terminals 101 to 112 constant (equivalent to the second example in FIG. 5B) and reduce the delay in both upward and downward communications.

In case where the coordinator 101 transmits data to each wireless terminal, which in turn returns a response to the coordinator 101 corresponding to the reception of the data, a delay caused is almost the same as the case shown in FIG. 6A. That is, it is possible to attain the advantage of both low power consumption and low delay.

In this example, similarly to the second example, it is possible to select and change a channel to be used in the networks A and B, indicated by dotted and solid lines in FIG. 6B, thereby accomplishing a further reduction in packet collision.

Now, the operation of controlling sleep control timings for the respective wireless terminals 101 to 112 will be described with reference to FIG. 6B.

Each of the wireless terminals 101 to 112 has one or more terminals which take a role of a destination to which data transmitted to the own terminal of interest can be forwarded. For example, the wireless terminal 105 has its destination as the wireless terminals 103, 107 and 109, while the wireless terminal 102 has the wireless terminal 101.

Each of the wireless terminals 101 to 112 sets the timing of turning on the power source of its receiver section to a timing ahead of the reception timing of a packet in a wireless terminal to which the packet is destined. Here, all the terminals may refer to the timing in the coordinator 101 as a standard.

In the examples described with reference to FIGS. 5A through 6B, the coordinator 101 is adapted to perform the power saving. However, the power source of the coordinator 101 may frequently be turned on. In such a case, the wireless terminal, such as 102, which has the coordinator 101 as its sole destination, can freely select the reception timing of packets by itself. In the sequence following, all the wireless terminals 103 to 112 can subsequently determine the respective reception timings.

According to the illustrative embodiment mentioned above, one or more advantages can be achieved as following:

It is possible to unify the power consumption between the wireless terminals, thereby extending the network lifetime;

It is also possible to separate the upward and downward communication routes from each other with a higher communication efficiency; and It is possible to reduce a delay caused by both upward and downward communication directions, thereby extending the network lifetime.

Next, an alternative embodiment of the wireless communication system according to the present invention will be described in detail. The alternative embodiment is also applied to each of the wireless terminals included in the wireless multi-hop network.

FIG. 7 schematically shows the illustrative configuration of a wireless multi-hop network 20 according to the alternative embodiment. In the figure, wireless terminals 501 to 508 respectively operate in a multi-hop system, and the wireless terminal 501 especially serves as a coordinator for managing the entire network. Solid and dotted lines connecting two wireless terminals indicate that the two wireless terminals connected with each other have a link established between them. In practice, such pairs of wireless terminals may be set for enabling a direct communication besides what are indicated by the solid and dotted lines.

FIG. 7A shows an example of network condition when the network is configured although it partially shows a condition when using the network. FIGS. 7B and 7C show another example of network condition while the network is used.

In FIGS. 7A, 7B and 7C, encircled numerals associated with the wireless terminals 501 to 508 indicate the number assigned in configuring the network, herein after referred to as assigned number. The coordinator 501 is exceptionally assigned to a number "0" when the network configuration is started.

In FIG. 7A, the network satisfies the requirements as following.

Each of the wireless terminals 502 to 508 can communicate directly with another wireless terminal which is assigned the number smaller by one or two than the number assigned to that terminal.

In FIGS. 7A, 7B and 7C, the solid and dotted lines indicate communication routes connecting the wireless terminal of interest to the other wireless terminals with the assigned numbers smaller by "1" and "2", respectively, than that of the terminal of interest. The wireless terminal with the number "1" assigned may exceptionally communicate only with the other wireless terminal with the number "0" assigned, i.e. the coordinator 501.

In the following, description will be made especially on the communication between the coordinator 501 and each of the wireless terminals 502 to 508. The description also may be applied to the communication between any terminals.

FIG. 7B shows another example of configuring the networks which is an improvement on the example shown in FIG. 7A so that two routes are prepared. One route corresponds to a network arranged relay terminals having odd assigned numbers and indicated with solid lines, and the other route corresponds to another network arranged relay terminals having even assigned numbers and indicated with dotted lines.

FIG. 7C shows a further example of configuring the networks which is an improvement on the example shown in FIG. 7A so that upward and downward communications are separated from each other. In the following description, the communication from each of the wireless terminals 502 to 508 to the coordinator 501 is referred to as upward communication and the reverse direction of communication as downward communication. In FIG. 7C, a dotted line route via the wireless terminals with an even assigned number is used for the downward communication, while a solid line route via other wireless terminals with an odd assigned number is used for the upward communication. In addition, the communication route between the wireless terminals with the even assigned number and the odd assigned number is available for both upward and downward communications. For example, a communication route between the wireless terminals 503 and 502 may be used for the downward communication meant for the wireless terminal 502 or for the upward communication meant for the wireless terminal 503.

Requirements for configuring the wireless terminals 501 to 508 are basically the same as the example described on the illustrative embodiment shown in FIGS. 2 and 3.

It is different from the illustrative embodiment shown in FIGS. 2 and 3 that a communication route is established by the peripheral terminal manager 41 and the route controller 42, which includes the network connecting section 421, the network switching control 422 and the communication direction control 423, in the condition manager 406 on the basis of the assigned number of each wireless terminal. The functions of these configuring sections will be described in connection with their operation.

Now, the transfer route setting operation in the wireless multi-hop network 20 will be described according to the alternative embodiment. In the following, a case will be described where two networks will simultaneously be constructed in the wireless multi-hop network 20 to determine transfer routes on the networks. The number of the networks is not specifically limited to that of the specific embodiment. In addition, the various manners may be applied to constructing the networks so far as such manners satisfy the above-mentioned requirements for the network construction.

The network configuration according to the alternative embodiment is performed by transmitting and receiving a notice signal conveying the assigned number of each of the wireless terminals 502 to 508.

Figure 8:
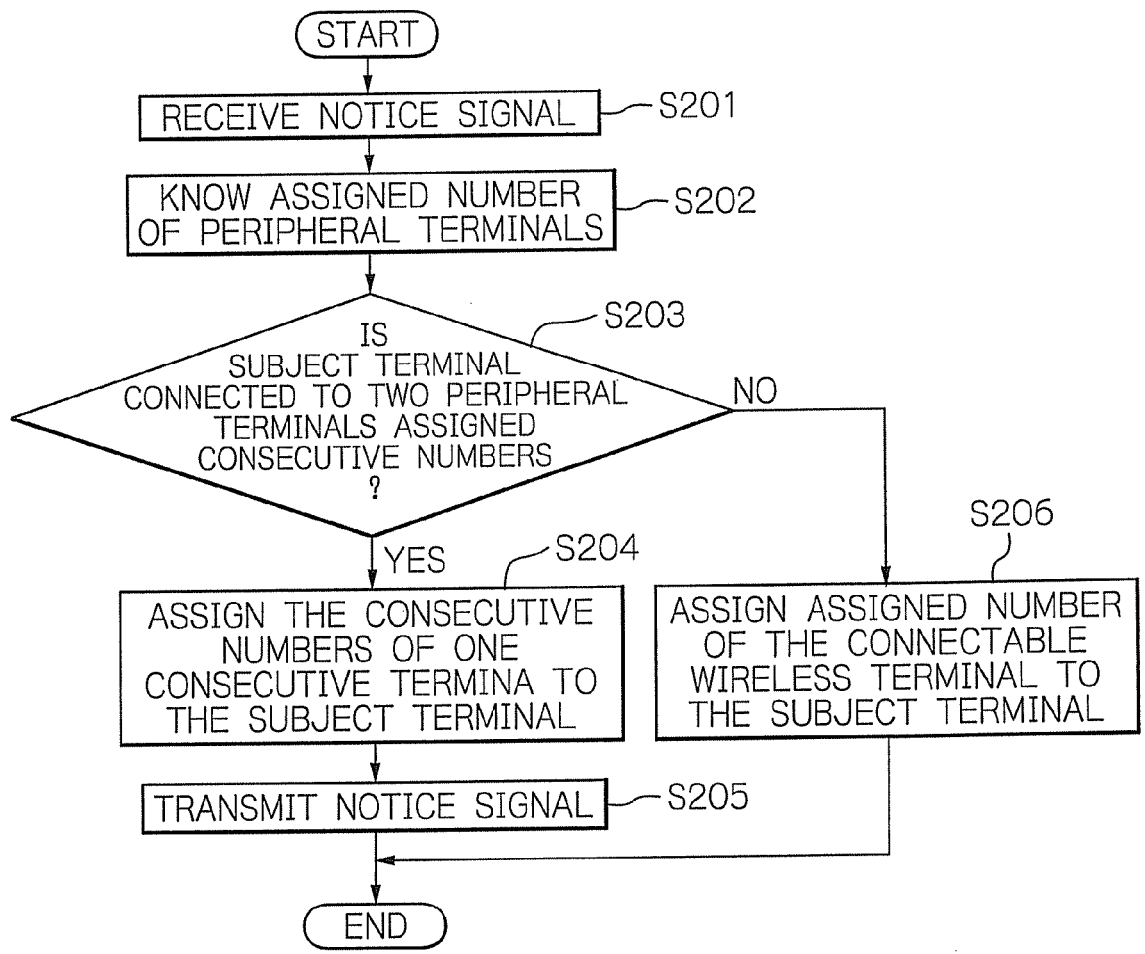
FIG. 8 is a flowchart useful for understanding how the communication on the wireless network shown in FIG. 7 establishes.

FIG. 8 is a flowchart useful for understanding how the assigned numbers on the wireless networks 502 to 508 are determined.

First, when the notice signal transmitted from a peripheral terminal is given to the subject wireless terminal in step S201, the subject terminal, i.e. the terminal of interest, can know the assigned number assigned to the peripheral terminal on the basis of the received notice signal in step S202. The assigned number of the peripheral terminal is managed by the peripheral terminal manager 41.

The subject wireless terminal also may receive the notice signals from the other peripheral terminals to know the assigned numbers of the peripheral terminals.

Then, the terminal of interest is connected to those peripheral terminals with the wireless links. When the terminal of interest is enabled to communicate directly with two consecutive wireless terminals having the respective assigned numbers "x−1" and "x" in step S203, the terminal of interest joins the network and is assigned to the assigned number "x+1" in step S204. After waiting for a period having its length random, the terminal of interest transmits the notice signal conveying information indicating the assigned number in step S205.

For instance, as shown in FIG. 7A, the assigned number "0" is assigned to the coordinator 501. When the coordinator 501 transmits the notice signal including the assigned number "0" to the wireless terminals 502 and 503, the wireless terminals 502 and 503 perform the assigned number determination respectively.

A wireless terminal, when having received the notice number with the assigned number "0", exceptionally can have a new assigned number without receiving signals from two wireless terminals. In this example, therefore, the wireless terminal 502 allows a new assigned number "1" to be assigned to itself to transmit the notice signal indicating the assignment to the peripheral terminals.

In addition, the wireless terminal 503 receives the notice signals from the coordinator 501 and the wireless terminal 502 to know on the basis of the signals that the assigned numbers "0" and "1" are assigned to the terminals 501 and 502, respectively. Then, the wireless terminal 503 allows the assigned number "2" to be assigned to itself to transmit the notice signal indicative of the assignment to the peripheral terminals. Similarly, all the wireless terminals will have the respective assigned numbers assigned in order.

In the step 203, if the terminal of interest is unable to be connected to the network since it received notice signals from the peripheral terminals till the given period elapses, namely, the terminal cannot receive signals from two terminals that have consecutive numbers assigned, then the terminal of interest may, exceptionally, have an assigned number allotted to itself in the condition where the terminal of interest is connected only to the single terminal in step S206. In this case, however, part of the way of using networks described below may not be carried out.

Next, the operation of switching the parent network of the wireless terminal will be described according to the alternative embodiment. The manner of switching the parent networks to be described may be utilized in the condition shown in FIG. 7B. The manner of switching the parent networks may be performed by the network switching control 422 in the condition manager 406.

Each of the wireless terminals 502 to 508 can know wireless terminals connected to itself, i.e. the own terminal, on the basis of the information included in the notice signal from the peripheral terminal. The wireless terminal can utilize this peripheral terminal information to identify the assigned number of the peripheral terminal, thereby being able to configure the network as shown in FIG. 7B.

More specifically, two networks are prepared; one network is configured so that wireless links indicated by the solid lines are established by using relay terminals with odd assigned numbers, and the other network is configured so that wireless links indicated by the dotted lines are established by using relay terminals with even assigned numbers.

As descried above, when the networks are configured by using the method according to the alternative embodiment, the operation of either of two networks, i.e. networks of the solid lines and dotted lines makes communication available between any wireless terminals. Additionally, all the wireless terminals can relay only to either one of the networks.

The wireless terminal when not relaying, need not always keep its receiver section turned on, but may turn it on only when it transmits data or inquires regularly whether or not there is data addressed to the terminal. Therefore, this significantly contributes to reduction in power consumption.

Thus, the network switching control 422 can switch the network to be use as required, e.g. regularly or in response to an instruction provided from the coordinator 501, so that the power consumption can be balanced among the wireless terminals while lifetimes of the terminals can be increased or doubled compared with a case where the network cannot be switched.

For the timing of switching the networks, various manners can be utilized. For example, in one manner, all the wireless terminals switch simultaneously or synchronously the respective networks, or in another manner, the coordinator broadcasts switching signals to all the terminals, i.e. in a flooding, for switching the networks. As both networks operating temporarily causes no problems, strict simultaneity for switching the networks by all the wireless terminals is not required.

Moreover, in the alternative embodiment, the selecting operation of a communication manner corresponding to the communication direction, such as the upward or downward direction, for use will be described. The selecting manner may be utilized in a condition shown in FIG. 7C. This selecting manner is carried out by the communication direction control 423 in the condition manager 406.

As shown in FIG. 7C, the upward communication uses the network indicated by the solid lines, while the downward communication uses the other network indicated by the dotted lines. As a result, all packets are transferred along the arrows shown in FIG. 7C.

Since all the wireless terminals 501 to 508 are connected to both networks, even when the network is used on a one-way traffic, a communication route between any terminals can be maintained.

Here, the communication direction control 423 also can suitably select a communication channel corresponding to the upward or downward direction. In this case, the communication direction control 423 may distinguish the channels to be use with various manners similarly with the illustrative embodiment described earlier.

Specifically, the wireless terminals with even and odd assigned numbers may utilize respective channels different from each other. The coordinator 501 uses the same channel as used by the terminal with odd number assigned to receive upward communication.

When the wireless terminal transmits a packet, the terminal may select a channel according to the channel used by the destination wireless terminal to transmit the packet on the selected channel. Specifically, the wireless terminal 507, for example, distinguishably uses different channels between the cases of transmitting to the wireless terminal 508 and to the wireless terminal 506. It may be deemed that the dotted and solid lines shown in FIG. 7C indicate the channels to be used.

Furthermore, in the alternative embodiment, the operation of utilizing efficient sleep control will be described. The sleep control may be performed by the communication direction control 423.

In the selecting manner mentioned above, like the selecting manner according to the illustrative embodiment shown in and described with reference to FIG. 4, the power consumption of the wireless terminals 501 to 508 will not be reduced although the communication efficiency may improve. In order to solve this problem, the sleep controlling manner in the illustrative embodiment described earlier is performed so that the wireless terminals regularly power on and off the receiver section. Thus, the power saving can be achieved.

The sleep control is implemented by applying the method in the illustrative embodiment described with reference to FIGS. 5 and 6, a repetitive description of the sleep control according to the alternative embodiment is omitted here.

Figure 9:
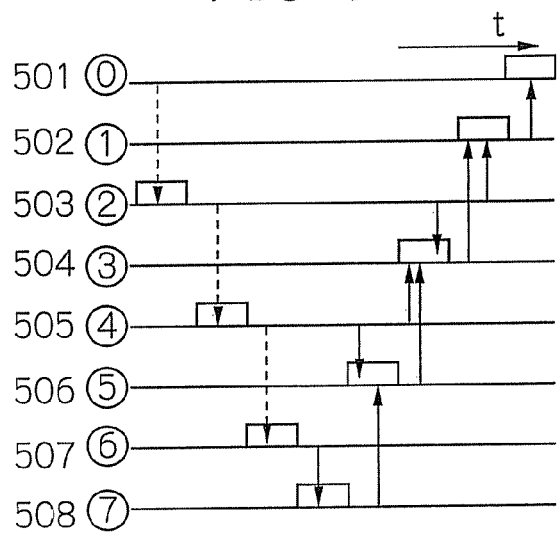
FIG. 9 schematically shows an example of communication directions and terminal activation time on the wireless network shown in FIG. 7.

FIG. 9 schematically shows an illustrative operation of the sleep controlling in the alternative embodiment in the network configuration shown in FIG. 7C. In FIG. 9, the numerals encircled indicates the numbers assigned to the wireless terminals, and the rectangles indicate the durations of the activation time of the wireless terminals in the horizontal direction.

In the communication condition shown in FIG. 9, like the illustrative embodiment shown in FIG. 6B, the networks can utilize the upward and downward communications separately from each other, and keep the time of turning on the receiver sections constant for all the wireless terminals in the same condition as FIG. 5B. Thus, the delay can be minimized for both upward and downward directions. In addition, the channels may be changed between the dotted line or downward communication and the solid line or upward communication depicted in FIG. 9 to thereby further reduce probability in packet collision.

According to the alternative embodiment mentioned above, one or more advantages in addition to the illustrative embodiment described earlier can be achieved as following:

In the alternative embodiment, without managing the patent network information of the peripheral terminals needed in the illustrative embodiment described earlier, the number assigned to each wireless terminal is managed, thus being simplified in processing; and In the illustrative embodiment described earlier, it is necessary that the terminals refer to the timing in the coordinator as a standard to produce the order of the reception timing of the terminal. According to the alternative embodiment, however, the number is assigned to each wireless terminal, so that the reception timing can be assigned by using the assigned number. More specifically, the terminals with an even number assigned have the reception timing delayed from the standard, or reference, in the order of the assigned numbers, and the terminals with an odd number assigned have the reception timing advanced from the standard, or reference, in the order of the assigned numbers, thus simply determining the reception timing as shown in FIG. 9.

Next, a further alternative embodiment of the method of utilizing the networks will be described in detail. In the further alternative embodiment, the network utilizing method includes characteristic functional sections as following, in addition to those of the illustrative embodiment stated earlier. In the alternative embodiment, the additional functional sections may be utilized.

In the instant alternative embodiment, each wireless terminal can know the condition of the peripheral terminals in some degree on the basis of information contained in a notice signal. Thus, by utilizing the information, each wireless terminal makes available a communication with wireless terminals other than a predetermined wireless terminal.

As an example, the instant alternative embodiment will be described with regard to the wireless terminal 109 shown in FIG. 1B. In FIG. 1B, the wireless terminal 109 transfers data to the wireless terminal 106 for the upward communication. However, the wireless terminal 108 also has a similar function with the wireless terminal 106, which belongs to the network B and has a communication route to the wireless terminal 101. According to the present alternative embodiment, if the wireless terminal 109 fails to communicate with the wireless terminal 106, e.g. in case where the failure occurs in the wireless terminal 106 itself or any obstacle is brought between the wireless terminals 109 and 106, then the terminal 109 may switch to data transfer toward the wireless terminal 108 so as to maintain the general operation in the network.

Figure 10A:
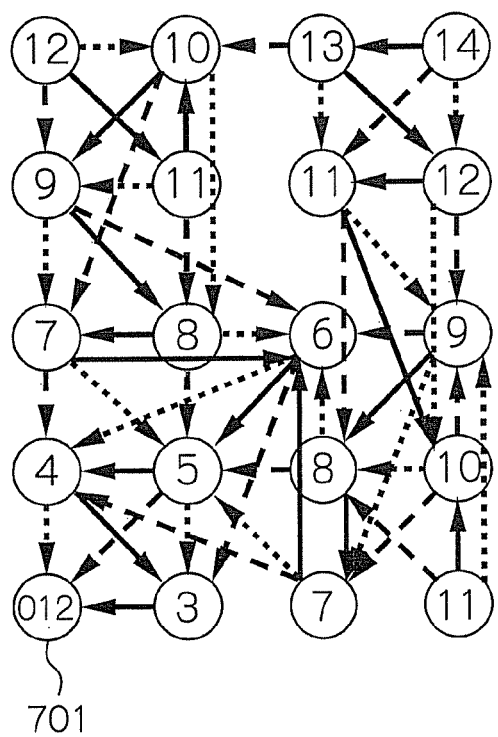
FIGS. 10A and 10B schematically show, when three networks are provided simultaneously, communication between wireless terminals on the wireless networks in accordance with a further alternative embodiment of the present invention.
Figure 10B:
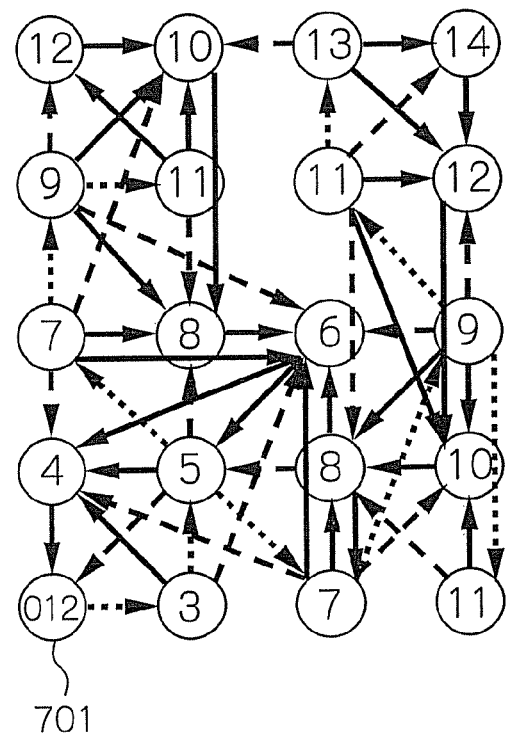

FIGS. 10A and 10B schematically show communication between the wireless terminals when three of the networks are simultaneously provided in accordance with the instant alternative embodiment.

In FIGS. 10A and 10B, links connecting a subject wireless terminal to an object wireless terminal are indicated by arrow lines. Particularly, links to an object terminal with assigned number smaller than the terminal of interest by one, two and three are indicated with solid lines, dotted lines and dashed lines, respectively. The numerals encircled associated with the wireless terminals 501 to 508 indicate the number assigned in configuring the network, i.e. assigned number. The coordinator 501 is exceptionally assigned to a number "0", when the network configuration is started. The wireless terminal 701 located at the left bottom in the figures, which is marked with numeral code "012" in circle, is a coordinator to operate as a special terminal having three assigned numbers.

In the condition shown in FIG. 1A, the three networks are suitably switched for use, and the actual switching controlling manner may be essentially the same as the alternative embodiment described above.

For instance, when the routes indicated by the dashed lines are utilized, it is possible to configure the network A connecting the terminals 3, 6, 9 and 12, the network B connecting the terminals 4, 7, 10 and 13, and the network "C" connecting the terminals 5, 8, 11 and 14. Every terminal may be connected directly to two networks to which the own terminal does not belong besides the network to which the terminal belongs by using the solid and dotted line routes. Thus, as the wireless terminal 109, for example, may switch to the data transfer to the wireless terminal 108, the general operation of the network can be maintained.

The networks configured as shown in FIG. 10A can be improved to produce the network configuration shown in FIG. 10B. In FIG. 10B, the solid line on a terminal of interest indicates a communication route connecting object wireless terminals with even number assigned among the terminals with the assigned number smaller by two or object wireless terminals with assigned number smaller by one. The communication routes are utilized in the direction from the terminals with odd assigned number to even assigned number, which are used for the upward communication.

In addition, the dotted lines indicate the communication routes connecting the wireless terminals with odd assigned number among the communication routes on the terminals with the assigned number smaller by two. The communication route is used for the downward communication. The downward communication may also use a route that is classified into the upward communication and connects a terminal with another assigned number differing from that assigned in the upward communication. That is, the downward communication may be operated the same fashion as the network shown in FIG. 7C.

Moreover, the dashed line route is a communication route connecting an object terminal with assigned number smaller by three from that of the terminal of interest. The operation of the dashed-line route varies depending on a combination of two wireless terminals connected with each other on the route. If one terminal of the combination has its assigned number larger than another terminal and the larger number is an odd number, then the route works as a bypass route of the upward communication from the one terminal with its assigned number larger to another with its assigned number smaller. If the larger assigned number given to a wireless terminal is an even number, it works as a bypass route of downward communication from a terminal with smaller assigned number to one with large assigned number.

As mentioned above, two or more networks are prepared to configure a network with the upward and downward communications separated from each other, thereby accomplishing a network having a bypass route and an excellent fault tolerance.

While the network utilizing method according to the present invention is described in respect of the illustrative embodiments, the invention is not restricted to a case where all functions of the method are simultaneously prepared but can be implemented in another case where the functions of the method are prepared separately from each other. That is, the network switching control and the communication direction control may be implemented independently.

The entire disclosure of Japanese patent application No. 2007-336984 filed on Dec. 27, 2007, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A wireless communication apparatus included in a wireless terminal among a plurality of wireless terminals forming a wireless communication network, comprising:
    a communication section for transmitting and receiving a data signal and terminal information to and from a peripheral wireless terminal existing in periphery of the wireless terminal;
    a terminal information manager for managing the terminal information received from the peripheral wireless terminal;
    a relay network determiner for referencing the terminal information received from the peripheral wireless terminal, and determining, when the wireless terminal can be connected to at least one of a plurality of relay networks provided within the wireless network, a first relay network and a second relay network that differs from the first relay network, as relay networks of the wireless terminal, to which the wireless terminal belongs, the first relay network providing an upward communication route from the wireless terminal to a managing terminal, the second relay network providing a downward communication route from the managing terminal to the wireless terminal;
    a terminal information advertiser for transmitting terminal information including information indicating the relay networks of the wireless terminal to the peripheral wireless terminal; and
    a forward processor for using the relay networks of the wireless terminal as a data signal transfer route to perform forward processing.

2. The wireless communication apparatus according to claim 1, wherein said relay network determiner for determining the relay networks of the wireless terminal, when the wireless terminal can be connected to all of the plurality of relay networks provided within the wireless network.

3. The wireless communication apparatus according to claim 1, further comprising a relay network changer for changing in a given manner at least one of the relay networks of the wireless terminal.

4. The wireless communication apparatus according to claim 1, further comprising a communication direction changer for changing in a given manner a communication direction of at least one of the relay networks of the wireless terminal.

5. The wireless communication apparatus according to claim 1, further comprising a communication direction changer for changing in a given manner a communication direction of at least one of the relay networks of the wireless terminal, wherein said communication direction changer distinguishes the upward communication route in a first communication direction and the downward communication route in a second communication direction in the wireless network to configure communication routes.

6. The wireless communication apparatus according to claim 1, further comprising a power controller for controlling, when at least one of the relay networks of the wireless terminal is utilized, a receiver of said communication section to be powered on or off according to a condition of the peripheral wireless terminal on a basis of the terminal information received from the peripheral wireless terminal.

7. The wireless communication apparatus according to claim 1, further comprising a power controller for controlling, when at least one of the relay networks of the wireless terminal is utilized, a receiver of said communication section to be powered on or off according to a condition of the peripheral wireless terminal on a basis of the terminal information received from the peripheral wireless terminal,
    wherein the condition includes a reception timing of at least one of destination terminals to which the wireless terminal transmits the data signal, a number of the destination terminals and a number of transfer terminals which transmit the data signal to the wireless terminal.

8. The wireless communication apparatus according to claim 1, further comprising a power controller for controlling, when at least one of the relay networks of the wireless terminal is utilized, a receiver of said communication section to be powered on or off according to a condition of the peripheral wireless terminal on a basis of the terminal information received from the peripheral wireless terminal,
    wherein said power controller controls said receiver synchronously with all of the plurality of wireless terminals.

9. The wireless communication apparatus according to claim 1, further comprising a power controller for controlling, when at least one of the relay networks of the wireless terminal is utilized, a receiver of said communication section to be powered on or off according to a condition of the peripheral wireless terminal on a basis of the terminal information received from the peripheral wireless terminal,
    wherein said power controller controls said receiver according to a reception timing of a destination terminal, to which the wireless terminal transmits the data signal, on a basis of the terminal information.

10. The wireless communication apparatus according to claim 1, further comprising a power controller for controlling, when at least one of the relay networks of the wireless terminal is utilized, a receiver of said communication section to be powered on or off according to a condition of the peripheral wireless terminal on a basis of the terminal information received from the peripheral wireless terminal,
    wherein said power controller controls said receiver according to a reception timing of a destination terminal, to which the wireless terminal transmits the data signal, on a basis of the terminal information, and
    said power controller powers on said receiver, when there exist a plurality of destination terminals to which the wireless terminal transmits the data signal before an earliest one of reception timings of the destination terminals.

11. The wireless communication apparatus according to claim 1, further comprising a power controller for controlling, when at least one of the relay networks of the wireless terminal is utilized, a receiver of said communication section to be powered on or off according to a condition of the peripheral wireless terminal on a basis of the terminal information received from the peripheral wireless terminal,
wherein, when transfer routes are utilized distinguishably between in the upward and downward communication routes, said power controller controls said receiver at timings for the upward and downward communication routes.

12. The wireless communication apparatus according to claim 1, wherein the terminal information is contained in relay network identifying information that identifies the relay networks of the wireless terminal,
said relay network determiner determining the relay networks of the wireless terminal on a basis of relay network identifying information of the peripheral wireless terminal.

13. The wireless communication apparatus according to claim 1, wherein the terminal information includes an assigned number assigned to the wireless terminal,
said relay network determiner assigning the wireless terminal to a subject assigned number on the basis of an assigned number of peripheral wireless terminals existing in periphery of the wireless terminal, said relay network determiner using the subject assigned number to determine the relay networks of the wireless terminal.

14. The wireless communication apparatus according to claim 1, wherein the terminal information includes an assigned number assigned to the wireless terminal,
said relay network determiner assigning the wireless terminal to a subject assigned number on the basis of an assigned number of peripheral wireless terminals existing in periphery of the wireless terminal, said relay network determiner using the subject assigned number to determine the relay networks of the wireless terminal, and
said relay network determiner divides the subject assigned number of the wireless terminal by a predetermined value to derive a remainder value from a result of the division, detects a wireless terminal capable of deriving a same value as the remainder value, and utilizes the wireless terminal detected to determine the relay networks of the wireless terminal.

15. The wireless communication apparatus according to claim 1, further comprising a network manager equipped in the managing terminal for managing the entirety of the wireless network.

16. The wireless communication apparatus according to claim 1, wherein the managing terminal belongs to both the first relay network and the second relay network.

17. The wireless communication apparatus according to claim 1, wherein said relay network determiner determines the relay networks of the wireless terminal, upon receiving a notice signal from the managing terminal.

18. The wireless communication apparatus according to claim 4, wherein the communication direction of the at least one of the relay networks is controlled to the reversed direction in response to a notice signal from the managing terminal.

19. A method of communicating by a wireless communication apparatus included in a wireless terminal forming a wireless communication network, wherein the apparatus comprises a communication section, a relay network determiner, a terminal information advertiser, a forward processor and a terminal information manager for managing terminal information received from a peripheral wireless terminal, said method comprising:
a communicating step of transmitting and receiving by the communication section a data signal and the terminal information to and from the peripheral wireless terminal existing in periphery of the wireless terminal;
a relay network determining step of referencing by the relay network determiner the terminal information received from the peripheral wireless terminal, and determining, when the wireless terminal can be connected to at least one of a plurality of relay networks provided within the wireless network, a first relay network and a second relay network that differs from the first relay network, as relay networks of the wireless terminal to which the wireless terminal belongs, the first relay network providing an upward communication route from the wireless terminal to a managing terminal, the second relay network providing a downward communication route from the managing terminal to the wireless terminal;
a terminal information advertising step of transmitting by the terminal information advertiser terminal information including information indicating the relay networks of the wireless terminal to the peripheral wireless terminal; and
a forward processing step of using by the forward processor the relay networks of the wireless terminal as a data signal transfer route to perform forward processing.

20. A machine-readable medium storing a wireless communication program executable by a computer for use in a wireless communication apparatus included in a wireless terminal forming a wireless communication network, the machine-readable medium being non-transitory, said program comprising:
a communication section to transmit and receive a data signal and terminal information to and from a peripheral wireless terminal existing in periphery of the wireless terminal;
a terminal information manager to manage the terminal information received from the peripheral wireless terminal;
a relay network determiner to reference the terminal information received from the peripheral wireless terminal, and to determine, when the wireless terminal can be connected to at least one of a plurality of relay networks provided within the wireless network, a first relay network and a second relay network that differs from the first relay network, as relay networks of the wireless terminal, to which the wireless terminal belongs, the first relay network providing an upward communication route from the wireless terminal to a managing terminal, the second relay network providing a downward communication route from the managing terminal to the wireless terminal;
a terminal information advertiser to transmit terminal information including information indicating the relay networks of the wireless terminal to the peripheral wireless terminal; and
a forward processor to use the relay networks of the wireless terminal as a data signal transfer route to perform forward processing.

* * * * *